(12) United States Patent
Hanson et al.

(10) Patent No.: US 7,499,763 B2
(45) Date of Patent: Mar. 3, 2009

(54) PERTURBATION TEST METHOD FOR MEASURING OUTPUT RESPONSES TO CONTROLLED PROCESS INPUTS

(75) Inventors: Simon P. Hanson, Venetia, PA (US); Murray F. Abbott, Upper St. Clair, PA (US)

(73) Assignee: Fuel and Furnace Consulting, Inc., Venetia, PA (US)

( * ) Notice: Subject to any disclaimer, the term of this patent is extended or adjusted under 35 U.S.C. 154(b) by 227 days.

(21) Appl. No.: 11/458,522

(22) Filed: Jul. 19, 2006

(65) Prior Publication Data

US 2007/0032907 A1 Feb. 8, 2007

Related U.S. Application Data

(60) Provisional application No. 60/700,971, filed on Jul. 20, 2005.

(51) Int. Cl.
*G05B 13/02* (2006.01)
*G01D 3/00* (2006.01)
*G01M 19/00* (2006.01)
*G01M 17/00* (2006.01)
*G01R 35/00* (2006.01)
*G06F 19/00* (2006.01)

(52) U.S. Cl. .............. 700/28; 700/38; 700/39; 702/108; 702/109; 702/112; 702/113

(58) Field of Classification Search .............. 700/28, 700/38–39; 702/108–109, 112–113
See application file for complete search history.

(56) References Cited

U.S. PATENT DOCUMENTS

| | | | |
|---|---|---|---|
| 3,617,717 A | 11/1971 | Smith | |
| 4,349,869 A * | 9/1982 | Prett et al. | 700/39 |
| 4,473,536 A * | 9/1984 | Carberg et al. | 423/239.1 |
| 4,719,587 A | 1/1988 | Berte | |
| 4,885,999 A | 12/1989 | Baba et al. | |
| 5,027,751 A | 7/1991 | Archer et al. | |
| 5,165,903 A | 11/1992 | Hunt et al. | |
| 5,406,496 A * | 4/1995 | Quinn | 702/106 |
| 5,423,272 A | 6/1995 | Dunn, Jr. et al. | |
| 5,457,625 A * | 10/1995 | Lim et al. | 700/29 |
| 6,002,232 A * | 12/1999 | McConnell et al. | 318/629 |
| 6,079,205 A * | 6/2000 | Yasui et al. | 60/276 |
| 6,278,899 B1 * | 8/2001 | Piche et al. | 700/44 |
| 6,299,433 B1 | 10/2001 | Gauba et al. | |
| 6,353,766 B1 * | 3/2002 | Weinzierl | 700/28 |
| 6,567,711 B1 * | 5/2003 | Hosek et al. | 700/55 |

(Continued)

*Primary Examiner*—Ronald D Hartman, Jr.
(74) *Attorney, Agent, or Firm*—McKay & Associates, P.C.

(57) ABSTRACT

The present invention is a method for determining the optimum operating practice for an industrial process. The methodology includes a combination of process control steps and data analysis techniques to investigate responses to controlled "black box" process inputs, e.g., coal and air feeds for coal-fired furnaces in the case studies above. A unique time-dependent perturbation is applied to individual process feed streams to give a signature in the data that permits the filtering and detection of various measured responses, e.g., continuous emission monitor readings for $NO_x$, $SO_2$, $CO_2$, CO, and opacity for regulated electric utility furnaces. The perturbation is implemented using the plant control system. Individual control signal set points are perturbed for each piece of equipment supplying process inputs of interest. As a result, complex commercial processes can be evaluated for optimization without changing the normal configuration of the system.

11 Claims, 13 Drawing Sheets

U.S. PATENT DOCUMENTS

| | | |
|---|---|---|
| 6,587,754 B2 | 7/2003 | Hung et al. |
| 6,596,220 B2 | 7/2003 | Gross |
| 6,715,432 B2 | 4/2004 | Tsumura et al. |
| 6,799,525 B2 | 10/2004 | Manos et al. |
| 6,901,351 B2 | 5/2005 | Daw et al. |
| 7,092,856 B1 * | 8/2006 | Hojo et al. .................. 703/2 |
| 7,113,835 B2 * | 9/2006 | Boyden et al. ................ 700/52 |
| 7,194,317 B2 * | 3/2007 | Kothare et al. ............... 700/29 |
| 2002/0035495 A1 | 3/2002 | Spira et al. |
| 2002/0061221 A1 | 5/2002 | Zauderer |
| 2004/0162624 A1 * | 8/2004 | Papiernik et al. .............. 700/38 |
| 2006/0100721 A1 * | 5/2006 | Piche .......................... 700/47 |
| 2007/0008100 A1 * | 1/2007 | Qi et al. ...................... 340/506 |

* cited by examiner

In[10]:=
```
waveFunction[average_, amplitude_, phase_, time_] := average + amplitude *
    (
      Sin[2 * Pi * 48 * (time + phase)]
        - Sin[3 * 2 * Pi * 48 * (time + phase)] / 9
        + Sin[5 * 2 * Pi * 48 * (time + phase)] / 25
        - Sin[7 * 2 * Pi * 48 * (time + phase)] / 49
    )
```
In[11]:=
```
wfaA = waveFunction[a[[1, 1]], a[[1, 2]], 0, t];
wfaB = waveFunction[a[[2, 1]], a[[2, 2]], del / 1440, t];
wfaC = waveFunction[a[[3, 1]], a[[3, 2]], del / 1440, t];
wfaD = waveFunction[a[[4, 1]], a[[4, 2]], del / 1440, t];
wfaE = waveFunction[a[[5, 1]], a[[5, 2]], del / 1440, t];
```
In[16]:=
```
wfbA = waveFunction[b[[1, 1]], b[[1, 2]], del / 1440, t];
wfbB = waveFunction[b[[2, 1]], b[[2, 2]], 0, t];
wfbC = waveFunction[b[[3, 1]], b[[3, 2]], del / 1440, t];
wfbD = waveFunction[b[[4, 1]], b[[4, 2]], del / 1440, t];
wfbE = waveFunction[b[[5, 1]], b[[5, 2]], del / 1440, t];
```
In[21]:=
```
wfcA = waveFunction[c[[1, 1]], c[[1, 2]], del / 1440, t];
wfcB = waveFunction[c[[2, 1]], c[[2, 2]], del / 1440, t];
wfcC = waveFunction[c[[3, 1]], c[[3, 2]], 0, t];
wfcD = waveFunction[c[[4, 1]], c[[4, 2]], del / 1440, t];
wfcE = waveFunction[c[[5, 1]], c[[5, 2]], del / 1440, t];
```
In[26]:=
```
wfdA = waveFunction[d[[1, 1]], d[[1, 2]], del / 1440, t];
wfdB = waveFunction[d[[2, 1]], d[[2, 2]], del / 1440, t];
wfdC = waveFunction[d[[3, 1]], d[[3, 2]], del / 1440, t];
wfdD = waveFunction[d[[4, 1]], d[[4, 2]], 0, t];
wfdE = waveFunction[d[[5, 1]], d[[5, 2]], del / 1440, t];
```
In[31]:=
```
wfeA = waveFunction[e[[1, 1]], e[[1, 2]], del / 1440, t];
wfeB = waveFunction[e[[2, 1]], e[[2, 2]], del / 1440, t];
wfeC = waveFunction[e[[3, 1]], e[[3, 2]], del / 1440, t];
wfeD = waveFunction[e[[4, 1]], e[[4, 2]], del / 1440, t];
wfeE = waveFunction[e[[5, 1]], e[[5, 2]], 0, t];
```

FIG. 3

In[36]:=
```
wfnA = waveFunction[n[[1, 1]], n[[1, 2]], 0, t];
wfnB = waveFunction[n[[2, 1]], n[[2, 2]], 0, t];
wfnC = waveFunction[n[[3, 1]], n[[3, 2]], 0, t];
wfnD = waveFunction[n[[4, 1]], n[[4, 2]], 0, t];
wfnE = waveFunction[n[[5, 1]], n[[5, 2]], 0, t];
```

In[41]:=
```
wf1A = waveFunction[s1[[1, 1]], s1[[1, 2]], del / 1440, t];
wf1B = waveFunction[s1[[2, 1]], s1[[2, 2]], del / 1440, t];
wf1C = waveFunction[s1[[3, 1]], s1[[3, 2]], del / 1440, t];
wf1D = waveFunction[s1[[4, 1]], s1[[4, 2]], del / 1440, t];
wf1E = waveFunction[s1[[5, 1]], s1[[5, 2]], 0, t];
```

In[46]:=
```
wf2A = waveFunction[s2[[1, 1]], s2[[1, 2]], del / 1440, t];
wf2B = waveFunction[s2[[2, 1]], s2[[2, 2]], del / 1440, t];
wf2C = waveFunction[s2[[3, 1]], s2[[3, 2]], del / 1440, t];
wf2D = waveFunction[s2[[4, 1]], s2[[4, 2]], del / 1440, t];
wf2E = waveFunction[s2[[5, 1]], s2[[5, 2]], 0, t];
```

In[51]:=
```
wf3A = waveFunction[s3[[1, 1]], s3[[1, 2]], del / 1440, t];
wf3B = waveFunction[s3[[2, 1]], s3[[2, 2]], del / 1440, t];
wf3C = waveFunction[s3[[3, 1]], s3[[3, 2]], del / 1440, t];
wf3D = waveFunction[s3[[4, 1]], s3[[4, 2]], del / 1440, t];
wf3E = waveFunction[s3[[5, 1]], s3[[5, 2]], 0, t];
```

In[56]:=
```
del = -(1 / 2 + 1 / 64 + 1 / 128) // N
```

Out[56]=

-0.523438

In[57]:=
```
Plot[wfaA + wfaB + wfaC + wfaD + wfaE, {t, 0, 1 / 48}]
```

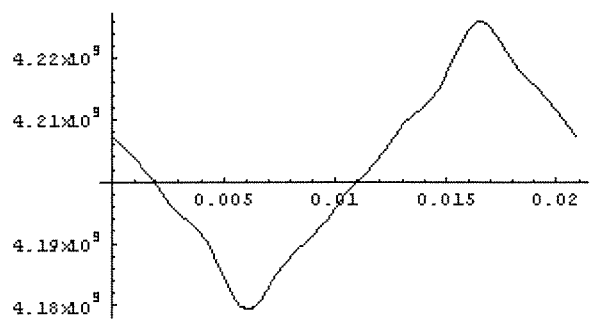

FIG. 3 (CONT.)

Out[57]=
      - Graphics -
In[58]:=
Plot[wfbA + wfbB + wfbC + wfbD + wfbE, {t, 0, 1/48}]
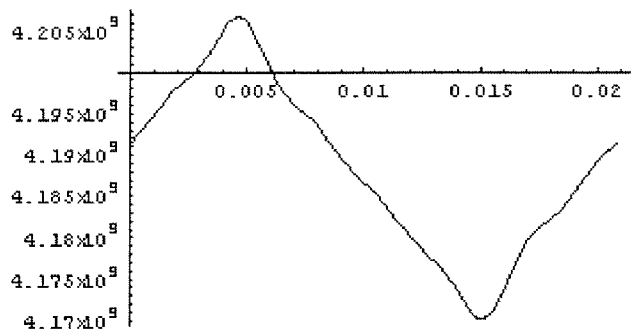
Out[58]=
      - Graphics -
In[59]:=
Plot[wfcA + wfcB + wfcC + wfcD + wfcE, {t, 0, 1/48}]
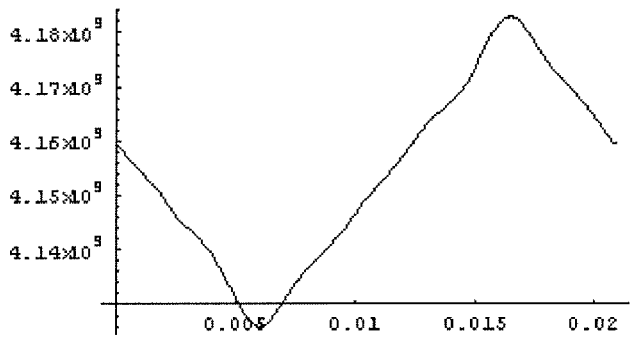
Out[59]=
      - Graphics -
In[60]:=
Plot[wfdA + wfdB + wfdC + wfdD + wfdE, {t, 0, 1/48}]
FIG. 3 (CONT.)

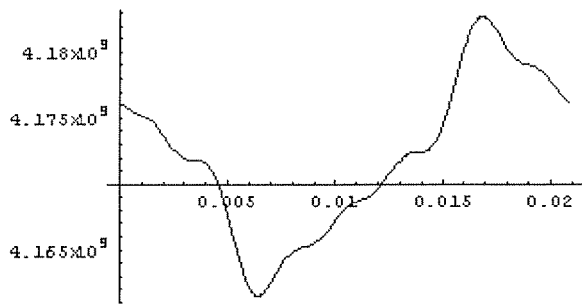
Out[60]=
- Graphics -
In[61]:=   Plot[wfeA + wfeB + wfeC + wfeD + wfeE, {t, 0, 1/48}]
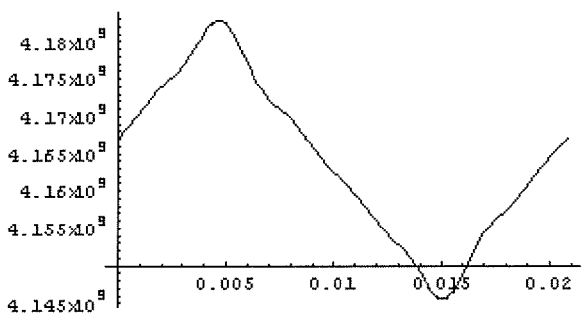
Out[61]=
- Graphics -
In[62]:=   Plot[wf1A + wf1B + wf1C + wf1D + wf1E, {t, 0, 1/48}]
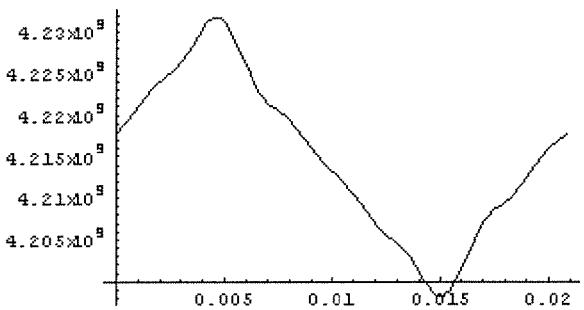
Out[62]=
- Graphics -
FIG. 3 (CONT.)

In[63]:=
Plot[wf2A + wf2B + wf2C + wf2D + wf2E, {t, 0, 1/48}]
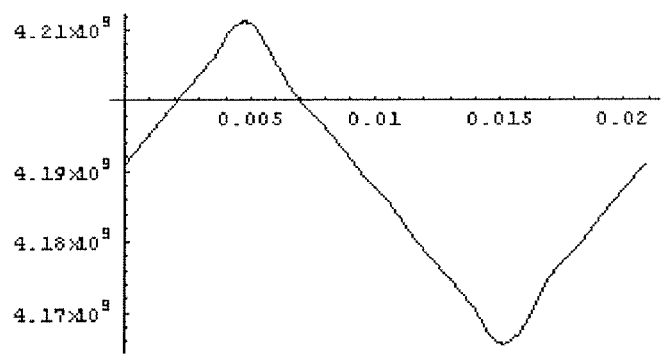
Out[63]=
- Graphics -
In[64]:=
Plot[wf3A + wf3B + wf3C + wf3D + wf3E, {t, 0, 1/48}]
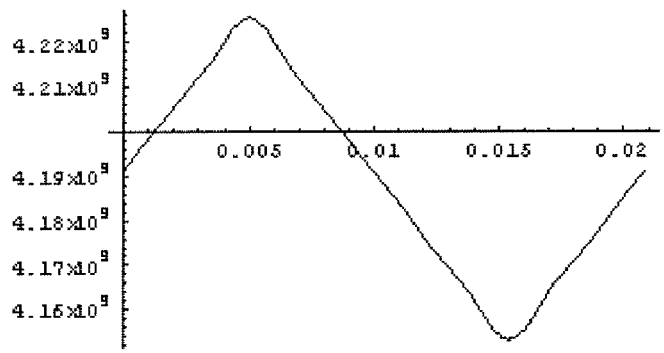
Out[64]=
- Graphics -
FIG. 3 (CONT.)

In[65]:=
```
ta = NMaximize[{wfaA + wfaB + wfaC + wfaD + wfaE, t > 0.015, t < 1/48}, t]
tb = NMaximize[{wfbA + wfbB + wfbC + wfbD + wfbE, t > 0, t < 1/48}, t]
tc = NMaximize[{wfcA + wfcB + wfcC + wfcD + wfcE, t > 0.015, t < 1/48}, t]
td = NMaximize[{wfdA + wfdB + wfdC + wfdD + wfdE, t > 0.015, t < 1/48}, t]
te = NMaximize[{wfeA + wfeB + wfeC + wfeD + wfeE, t > 0, t < 1/48}, t]
t1 = NMaximize[{wf1A + wf1B + wf1C + wf1D + wf1E, t > 0, t < 1/48}, t]
t2 = NMaximize[{wf2A + wf2B + wf2C + wf2D + wf2E, t > 0, t < 1/48}, t]
t3 = NMaximize[{wf3A + wf3B + wf3C + wf3D + wf3E, t > 0, t < 1/48}, t]
```

Out[65]=
$\{4.22589 \times 10^9, \{t \to 0.016521\}\}$

Out[66]=
$\{4.20658 \times 10^9, \{t \to 0.00464617\}\}$

Out[67]=
$\{4.18282 \times 10^9, \{t \to 0.016454\}\}$

Out[68]=
$\{4.18268 \times 10^9, \{t \to 0.0168413\}\}$

Out[69]=
$\{4.18282 \times 10^9, \{t \to 0.00466843\}\}$

Out[70]=
$\{4.23176 \times 10^9, \{t \to 0.00461872\}\}$

Out[71]=
$\{4.2111 \times 10^9, \{t \to 0.00477218\}\}$

Out[72]=
$\{4.22555 \times 10^9, \{t \to 0.00498782\}\}$

Fig. 4

In[73]:=
```
avgMatrix = {
    Transpose[a][[1]],
    Transpose[b][[1]],
    Transpose[c][[1]],
    Transpose[d][[1]],
    Transpose[e][[1]]};
avgA = Transpose[Drop[Transpose[avgMatrix], -1]];
avgB = Transpose[avgMatrix][[6]];
```

In[76]:=
```
ampMatrix = {
    Transpose[a][[2]],
    Transpose[b][[2]],
    Transpose[c][[2]],
    Transpose[d][[2]],
    Transpose[e][[2]]};
ampA = Transpose[Drop[Transpose[ampMatrix], -1]];
ampB = Transpose[ampMatrix][[6]];
```

Fig. 5

In[79]:=
```
ampA[[1, 1]] = waveFunction[0, a[[1, 2]], 0, t] /. ta[[2]];
ampA[[1, 2]] = waveFunction[0, a[[2, 2]], del / 1440, t] /. ta[[2]];
ampA[[1, 3]] = waveFunction[0, a[[3, 2]], del / 1440, t] /. ta[[2]];
ampA[[1, 4]] = waveFunction[0, a[[4, 2]], del / 1440, t] /. ta[[2]];
ampA[[1, 5]] = waveFunction[0, a[[5, 2]], del / 1440, t] /. ta[[2]];
```
In[84]:=
```
ampA[[2, 1]] = waveFunction[0, b[[1, 2]], del / 1440, t] /. tb[[2]];
ampA[[2, 2]] = waveFunction[0, b[[2, 2]], 0, t] /. tb[[2]];
ampA[[2, 3]] = waveFunction[0, b[[3, 2]], del / 1440, t] /. tb[[2]];
ampA[[2, 4]] = waveFunction[0, b[[4, 2]], del / 1440, t] /. tb[[2]];
ampA[[2, 5]] = waveFunction[0, b[[5, 2]], del / 1440, t] /. tb[[2]];
```
In[89]:=
```
ampA[[3, 1]] = waveFunction[0, c[[1, 2]], del / 1440, t] /. tc[[2]];
ampA[[3, 2]] = waveFunction[0, c[[2, 2]], del / 1440, t] /. tc[[2]];
ampA[[3, 3]] = waveFunction[0, c[[3, 2]], 0, t] /. tc[[2]];
ampA[[3, 4]] = waveFunction[0, c[[4, 2]], del / 1440, t] /. tc[[2]];
ampA[[3, 5]] = waveFunction[0, c[[5, 2]], del / 1440, t] /. tc[[2]];
```
In[94]:=
```
ampA[[4, 1]] = waveFunction[0, d[[1, 2]], del / 1440, t] /. td[[2]];
ampA[[4, 2]] = waveFunction[0, d[[2, 2]], del / 1440, t] /. td[[2]];
ampA[[4, 3]] = waveFunction[0, d[[3, 2]], del / 1440, t] /. td[[2]];
ampA[[4, 4]] = waveFunction[0, d[[4, 2]], 0, t] /. td[[2]];
ampA[[4, 5]] = waveFunction[0, d[[5, 2]], del / 1440, t] /. td[[2]];
```
In[99]:=
```
ampA[[5, 1]] = waveFunction[0, e[[1, 2]], del / 1440, t] /. te[[2]];
ampA[[5, 2]] = waveFunction[0, e[[2, 2]], del / 1440, t] /. te[[2]];
ampA[[5, 3]] = waveFunction[0, e[[3, 2]], del / 1440, t] /. te[[2]];
ampA[[5, 4]] = waveFunction[0, e[[4, 2]], del / 1440, t] /. te[[2]];
ampA[[5, 5]] = waveFunction[0, e[[5, 2]], 0, t] /. te[[2]];
```
In[104]:=
```
ampS1 = Range[5];
ampS1[[1]] = waveFunction[0, s1[[1, 2]], del / 1440, t] /. t1[[2]];
ampS1[[2]] = waveFunction[0, s1[[2, 2]], del / 1440, t] /. t1[[2]];
ampS1[[3]] = waveFunction[0, s1[[3, 2]], del / 1440, t] /. t1[[2]];
ampS1[[4]] = waveFunction[0, s1[[4, 2]], del / 1440, t] /. t1[[2]];
ampS1[[5]] = waveFunction[0, s1[[5, 2]], 0, t] /. t1[[2]];
```

Fig. 6

In[110]:=
```
ampS2 = Range[5];
ampS2[[1]] = waveFunction[0, s2[[1, 2]], del / 1440, t] /. t2[[2]];
ampS2[[2]] = waveFunction[0, s2[[2, 2]], del / 1440, t] /. t2[[2]];
ampS2[[3]] = waveFunction[0, s2[[3, 2]], del / 1440, t] /. t2[[2]];
ampS2[[4]] = waveFunction[0, s2[[4, 2]], del / 1440, t] /. t2[[2]];
ampS2[[5]] = waveFunction[0, s2[[5, 2]], 0, t] /. t2[[2]];
```

In[116]:=
```
ampS3 = Range[5];
ampS3[[1]] = waveFunction[0, s3[[1, 2]], del / 1440, t] /. t3[[2]];
ampS3[[2]] = waveFunction[0, s3[[2, 2]], del / 1440, t] /. t3[[2]];
ampS3[[3]] = waveFunction[0, s3[[3, 2]], del / 1440, t] /. t3[[2]];
ampS3[[4]] = waveFunction[0, s3[[4, 2]], del / 1440, t] /. t3[[2]];
ampS3[[5]] = waveFunction[0, s3[[5, 2]], 0, t] /. t3[[2]];
```

Fig. 6 (cont.)

```
In[122]:=
    ampX = Inverse[ampA].ampB
    avgBcalc = avgA.ampX
    (avgBcalc - avgB) / avgB
    Apply[Plus, ((avgBcalc - avgB) / avgB)^2]
Out[122]=
    {1.18216×10^-7, 2.99408×10^-7, 2.45649×10^-7, 2.27303×10^-7, 3.12928×10^-7}
Out[123]=
    {1013.45, 1009.59, 1001.79, 1006.07, 1004.15}
Out[124]=
    {0.0100993, 0.0180993, -0.0225637, -0.00123192, -0.0061532}
Out[125]=
    0.000978079
```

FIG. 7

```
In[126]:=
    ampS1X = (s1[[6, 2]] - Sum[ampX[[k]] * ampS1[[k]], {k, 4}]) / ampS1[[5]]
    ampS2X = (s2[[6, 2]] - Sum[ampX[[k]] * ampS2[[k]], {k, 4}]) / ampS2[[5]]
    ampS3X = (s3[[6, 2]] - Sum[ampX[[k]] * ampS3[[k]], {k, 4}]) / ampS3[[5]]
Out[126]=
    2.34508×10^-7
Out[127]=
    3.04763×10^-7
Out[128]=
    2.47589×10^-7
```

FIG. 8

PERTURBATION TEST METHOD FOR MEASURING OUTPUT RESPONSES TO CONTROLLED PROCESS INPUTS

SPECIFIC REFERENCE

This application hereby claims benefit of provisional application Ser. No. 60/700,971, filed Jul. 20, 2005.

BACKGROUND

1. Field of the Invention

The present invention relates to any physical process that is carried out in a closed system (sometimes referred to as a "black box") with input and output streams. The primary purpose of this invention is to characterize and optimize specific responses or output streams from complex industrial processes. The invention is demonstrated here in two case studies that characterize $NO_x$ emissions from different coal-fired boilers for the energy industry; however, it is applicable to characterize any measurable conserved quantity (e.g., mass, energy and momentum) in all industrial processes. This invention permits the study of complex commercial processes without changing the normal configuration, using short-duration tests, and with high accuracy. Accordingly, this invention may be applied to define best operating practices for all industrial processes or, through automation, be applied to give intelligent feedback control.

2. Description of the Related Art

The current industrial testing methods employed to characterize or optimize complex processes include single parameter tests, factorial-design tests, fractional factorial screening tests, mixture-design tests, simplex optimization methods, and neural network optimization methods. All of these experimental methods require long duration tests to obtain statistically significant results that are process independent. These methods are used sparingly because of the difficulty and high cost associated with completing such tests in commercial-scale process equipment.

The particular application reported here is for coal-burning furnaces used for power and industrial steam generation. This is predominantly important in electric utility power generation applications, which are highly regulated by Federal and State environmental authorities. The method of the present invention falls within the field of optimization of the staged combustion process for reducing $NO_x$ emissions and maintaining or improving furnace performance. Optimization requires feedback for control of the diverse equipment in the fuel delivery system designs used by the industry.

Fuel and Air Delivery System Equipment Control

Coal-fired boilers typically have multiple arrangements of coal pulverizing mills, each mill supplying coal through multiple pipes to multiple burners within the boiler. Each parallel coal supply path typically originates at a respective pulverizer mill and terminates at the individual burner mounted in the boiler. Each coal pipe has its own characteristic mechanical system performance/resistance properties for the two phase flow of primary air and coal, and this varies for each parallel coal pipe path at any given time and boiler load, based upon a number of system factors relating to both equipment and process variables. For example, equipment such as a forced draft fan, air heater, mill exhauster fan, coal feeder, coal pulverizer, coal classifier, riffle box/splitter, fixed orifice, piping system, air flow and coal flow monitor, coal damper, burner isolation valve, burner, boiler, and process parameters such as elevation, air temperature, air pressure, air flow, coal flow, coal density, coal moisture, coal composition and coal particle size all impact the performance/resistance characteristics of the fuel delivery system. In other words, as the boiler load changes and as the individual mechanical factors vary for each coal pipe, the resistance changes for the total coal delivery system and each individual coal pipe within that system.

Coal flow balancing of multiple burners is a difficult problem for plant engineers and operators. It is typically performed as an iterative series of manual coal flow measurements and adjustments of flow restrictive devices in the coal piping. With the introduction of manual coal dampers, coal flow has been balanced by adjusting each manual damper in each of the pulverized coal pipes that supplies the burners from a single mill. The coal flow rates in each pipe are measured manually by sampling with a coal probe traversing across the coal pipe area. While this approach has the potential to achieve approximate balance, changes in fuel consumption, operating conditions and wear on the orifice plates result in uncontrollable coal flow balance variations. However, as a problem attendant to the use of coal flow and air flow control, oxygen is increased in the coal mixture, exacerbating the $NO_x$ production problem.

Combustion System Designs for $NO_x$ Emission Control

Two-stage combustion methods are combustion techniques ($NO_x$ reduction techniques) for reducing the concentration of $NO_x$ generated in the furnace exhaust gas. The two-stage combustion methods are classified into the following two approaches. One approach is to reduce the $NO_x$ generation of a furnace as a whole, while the other approach is to reduce the $NO_x$ generation of a single burner.

In the approach to reduce the $NO_x$ concentration of a furnace as a whole, the air ratio (ratio of the amount of supplied air to the amount of necessary air for completely combusting an amount of fuel; the air ratio of unity corresponds to one stoichiometric equivalent) in the burner zone of the furnace is maintained below unity. In this fuel-rich condition, generated $NO_x$ is chemically reduced, and hence $NO_x$ reduction is achieved. The unburned carbon resulting from this approach is completely combusted with air added through an air inlet provided downstream of the burner zone.

In the approach to reduce the $NO_x$ generation of a single solid fuel burner (simply a burner, in some cases hereafter) such as a pulverized-coal burner, secondary and tertiary air flows are swirled, thereby delaying the mixing thereof with the flow of pulverized-coal burning with primary air alone. By virtue of this, a large chemical reduction region is formed (such a burner is called a low-$NO_x$ burner, hereafter).

These techniques have achieved a reduction of $NO_x$ concentration in the exhaust gas down to 130 ppm (fuel ratio=fixed carbon/volatile matter=2, nitrogen content in the coal=1.5%, and unburned carbon content in the ash=5% or less). Nevertheless, the regulated value of $NO_x$ concentration in the exhaust gas has been tightened year by year, and the required value of $NO_x$ concentration in the exhaust gas for the near future is 100 ppm or less.

Low $NO_x$ burners capable of reducing $NO_x$ generation down to 100 ppm or less have been developed. Such burners include: a burner having an internal flame stabilizing zone for reinforcing the $NO_x$-reduced combustion in the burner section; and a burner having a flame stabilizing region for bridging between an internal flame stabilizing zone as described above and an external flame stabilizing zone provided in the outer periphery of the combustion nozzle through which the mixture of pulverized coal and carrier gas flows.

These designs are inherently reserved for new furnaces. However, in existing designs in the United States, retrofitting is a more economical objective for operating systems. In addition, the achieved ratios of air to coal in these units does not represent the optimal, achievable rates.

SUMMARY

The primary purpose of this invention is to characterize and optimize specific responses or output streams from complex industrial processes. The invention is demonstrated here in two case studies that characterize $NO_x$ emissions from different coal-fired boilers for the energy industry with the objective of optimizing those emissions; however, it is applicable to characterize any measurable conserved quantity (e.g., mass, energy and momentum) in all industrial processes. Thus, the present invention relates to any physical process that is carried out in a closed system (sometimes referred to as a "black box") with input and output streams.

The invention comprehends a method for determining a best operating practice for minimizing emissions of $NO_x$ at a fossil fuel-fired plant, and it can be applied to any industrial process. The method generally comprises the steps of reviewing normal operation data for a normal configuration of equipment at a plant, and specifying a unique time-dependent perturbation (waveform) based on the review of the normal operation data. The next step is to apply the perturbation to one or more fuel inputs to give a signature in the normal operation data. Measured response data is then acquired from the fuel inputs with the signature to form a perturbation test data set. This perturbation test data set is further analyzed, comprising the steps of filtering the perturbation test data set, and subsequently carrying out matrix calculations for the perturbation test data set. In this manner a mass per unit energy value is quantified to allow the normal configuration of the equipment to be optimized to reduce the $NO_x$ without actually changing the normal configuration to determine the best operating practice.

In its broadest application, the present invention is a methodology that includes a combination of process control and data analysis techniques to investigate responses to controlled inputs. A unique time-dependent perturbation is applied to one or more inputs to give distinctive signatures, e.g., a specific waveform that permits the responses of each input perturbation to be individually filtered from any or all measured response variables. Responses dependent upon multiple inputs may be simultaneously solved by applying a separate signature to each input parameter, or performing a separate test for each input parameter. This invention permits the study of complex commercial processes without changing the normal configuration, using short-duration tests, and with high accuracy. Accordingly, this invention may be applied to define best operating practices for all industrial processes or, through automation, be applied to give intelligent feedback control. As a result, the applied perturbation waveform performs a function which is adapted to transform plant equipment and processes to a different, more efficient state.

The general form of the response function for an output from a process operating without configuration changes is:

$$y = \sum_{alli} \phi_i x_i$$

Where y is the response function of interest due to the input parameters $x_i$, and $\phi_i$ are the transfer functions.

If the input parameters are given a small perturbation, the vales of $\phi_i$ do not change and the following equation is valid.

$$\Delta y = \sum_{alli} \phi_i \Delta x_i$$

If several input parameters are perturbed simultaneously, a linearly independent equation of this form is required for each parameter, providing a set of simultaneous equations that may be solved for the values of $\phi_i$.

The combined application of a time-dependent perturbation to a process input for purposes of creating a signature in a measured response, and the subsequent application of a data filter and matrix computation comprise the present invention. This invention presents several benefits not otherwise available for comprehensive analysis of complex commercial process equipment operations:

Relationship of an output response to an input variable without changing the normal process configuration.

Study of complex commercial processes using comparatively short-duration tests.

Characterization of process responses with high accuracy independent of the process.

Thus, this invention may be applied to define best operating practices for any industrial process or, through automation, be applied to give intelligent feedback control.

BRIEF DESCRIPTION OF THE DRAWINGS

FIG. 2 shows matrices containing the reduced data from each test condition.

FIG. 3 shows a group of functions defining the triangular waveform of the driving function and definitions for the individual wave functions for a given test case and mill.

FIG. 4 shows the times corresponding to the maximum total coal flow, which is synchronized to the maximum $NO_x$ value.

FIG. 5 shows the average coal flow data from matrices "a", "b", "c", "d", and "e", which is transposed in "avgA" for solution of the simultaneous equation A·X=B.

FIG. 6 shows the equations which substitute the phase corrected values into "ampA", and generate and store the corrected mill coal flows for the cases for stockpiles 1, 2, and 3.

FIG. 7 shows the solution of ampA·ampX=ampB which includes the $NO_x$ generation by mill in lb/Btu.

FIG. 8 shows the computed $NO_x$ values in lb/Btu for burning the individual test fuels through Mill E.

DETAILED DESCRIPTION OF THE PREFERRED EMBODIMENT

Figure 1:
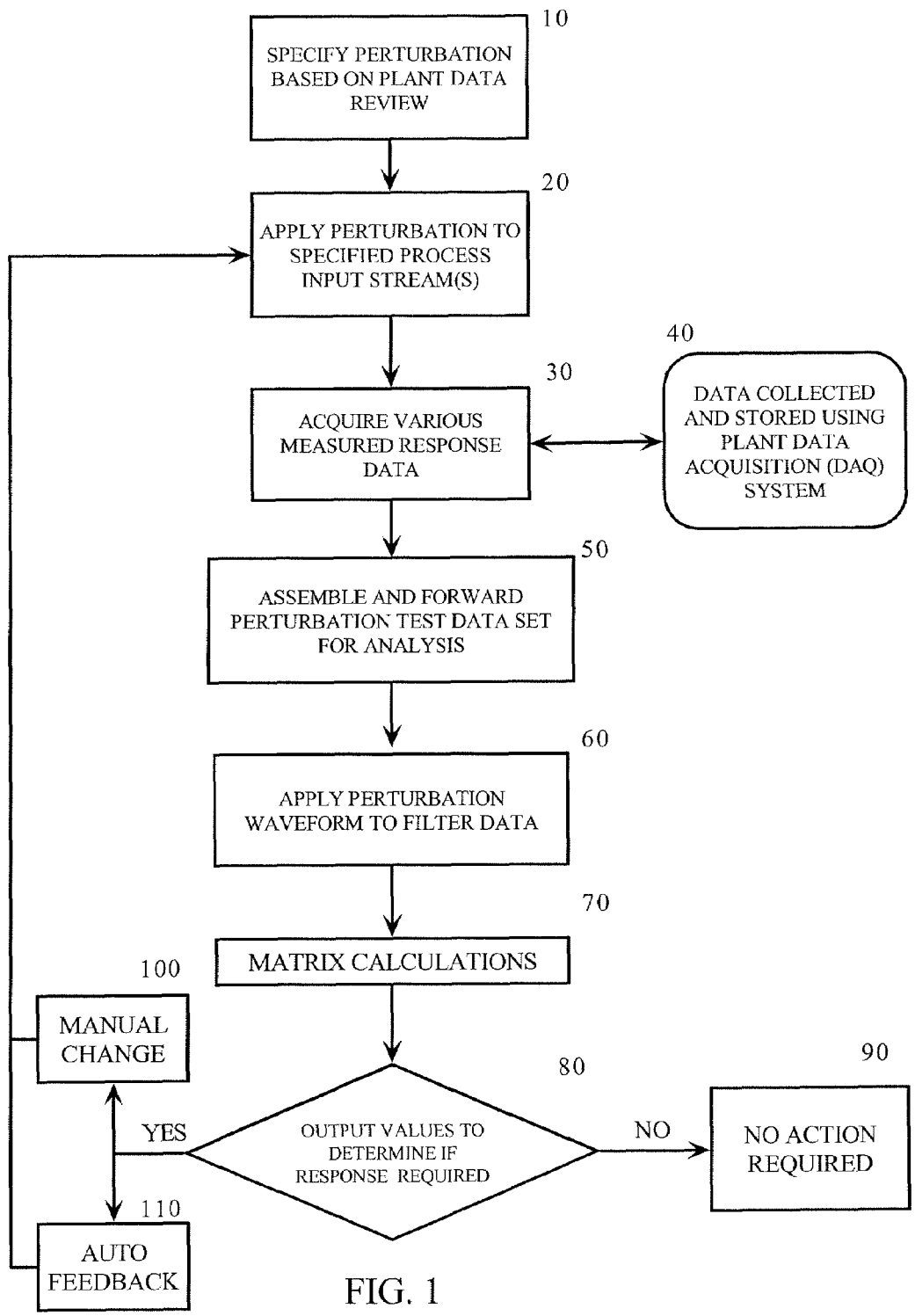
FIG. 1 is a flow diagram which represents the overall analysis methodology.

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated method, and such further applications of the principles of the invention illustrated herein, as would normally occur to persons skilled in the art to which the invention relates.

With reference then to FIGS. 1-8, the invention is a methodology that includes a combination of process control and data analysis techniques to investigate responses to controlled "black box" process inputs, including but not limited to gaseous, solid, or liquid feeds, e.g., coal and air feeds for coal-fired furnaces in the example case studies included herewith. A perturbation test waveform is specified based on the review of plant data 10 under normal operating conditions.

The applied (selected) perturbation waveform must be unique and identifiable in the responses of interest. Each individual piece of plant equipment has an inherent operating waveform or oscillation that usually has a comparatively short cycle period (seconds or a few minutes). The plant operators may also have a number of operating practices that occur with a regular frequency, typically over periods of hours. After reviewing data collected under normal operations (normal operation data), a unique waveform is selected with relatively long cycles (the frequency for Case 1 was 30 minutes, the frequencies used for Case 2 were 10 and 20 minutes), i.e., it does not correspond with any identifiable inherent operating frequencies. The shorter the frequency of the applied perturbation, the shorter the required test duration. In the preferred embodiment, a minimum of six perturbation cycles is utilized.

The unique, time-dependent perturbation is applied to individual process feed/input streams 20 to give a signature in the data that permits the filtering and detection of the various measured response data 30, e.g., continuous emission monitor readings for $NO_x$, $SO_2$, $CO_2$, CO, and opacity for regulated electric utility furnaces.

The perturbation is implemented using the plant control system. Individual control signal set points are perturbed for each piece of equipment supplying process/fuel inputs of interest, e.g., gravimetric feeder, fan, pump, damper, valve, and so on. The perturbation may take any predefined form, although simple periodic functions (waveforms) are easy to analyze, e.g., sine function, linear ramp up and down (triangular wave), step changes (square wave), or combination of ramp and step changes (sawtooth wave). Simple periodic events that occur with regularity also may be analyzed using this technique.

Measured response data are collected and stored using the plant data acquisition system 40. The response data points are typically selected from a tag list of all available data points in the plant data acquisition (DAQ) system. All data points are collected automatically and stored in an historian file according to rules set in the DAQ system. These rules typically specify a bandwidth outside of which the data point must vary in order to be added to the historian database, to reduce data storage requirements. The requested data (abbreviated tag list) for a perturbation test can be simultaneously collected and stored in a separate database with a specified data collection frequency, rather than the rules just described. That simplifies subsequent data analysis as the perturbation test data is assembled for analysis 50.

Matrix calculations are later carried out for this data 70. The matrix calculations may be carried out separately for each response variable. A general explanation of the computational methodology follows. It should be understood that the calculations result from program flow that can be implemented on computer readable media tangibly embodying the program of instructions executable by standard, general-purpose computers or which can be implemented as specialized devices. Calculated numerical results are used to determine whether a change or response is required 80 to transform plant equipment and processes to a different, more efficient state, for example by allowing the recommendation of fuel type changes without having to have actually made the changes to determine whether the changes are necessary or desired in the first place. Such changes can be made by manual operator changes 100 or automatically via feedback control 110 if action is required 90.

The response function for an output from a furnace operating without configuration changes is described by the following equation, where y is the response function of interest due to the input parameters, $x_i$, and $\phi_i$ are the transfer functions.

$$y = \sum_{all\,i} \phi_i x_i$$

If the input parameters are given a small perturbation, the values of $\phi_i$ do not change and the following equation is valid. If several input parameters are perturbed simultaneously, a linearly independent equation of this form is required for each parameter, providing a set of simultaneous equations that may be solved for the values of $\phi_i$.

$$\Delta y = \sum_{all\,i} \phi_i \Delta x_i$$

For example, when considering the $NO_x$ response to coal fed to the furnace as it is affected by mill, y is the mass rate of $NO_x$ emission, and $x_i$ is the energy rate of coal fed to a particular mill. The value of $\phi_i$ is the mass of $NO_x$ produced per unit of energy fed to mill i. Applying a perturbation to each mill sequentially, generates a linearly independent set of equations for $\phi_i$ solved by the following matrix, assuming 5 mills.

$$\begin{pmatrix} \phi_A \\ \phi_B \\ \phi_C \\ \phi_D \\ \phi_E \end{pmatrix} = \begin{pmatrix} \Delta x_{Aa} & \Delta x_{Ba} & \Delta x_{Ca} & \Delta x_{Da} & \Delta x_{Ea} \\ \Delta x_{Ab} & \Delta x_{Bb} & \Delta x_{Cb} & \Delta x_{Db} & \Delta x_{Eb} \\ \Delta x_{Ac} & \Delta x_{Bc} & \Delta x_{Cc} & \Delta x_{Dc} & \Delta x_{Ec} \\ \Delta x_{Ad} & \Delta x_{Bd} & \Delta x_{Cd} & \Delta x_{Dd} & \Delta x_{Ed} \\ \Delta x_{Ae} & \Delta x_{Be} & \Delta x_{Ce} & \Delta x_{De} & \Delta x_{Ee} \end{pmatrix}^{-1} \cdot \begin{pmatrix} \Delta y_a \\ \Delta y_b \\ \Delta y_c \\ \Delta y_d \\ \Delta y_e \end{pmatrix}$$

Where the uppercase subscript identifies the mill flow and transfer function, and the lowercase subscript indicates which mill has the applied perturbation. The practical problem facing the investigator is that the noise level of the response function, in this example, the measured $NO_x$ exiting the system, is large enough to require a perturbation that would significantly change the system configuration. However, by tagging the perturbation with a unique waveform to thereby form a signature perturbation waveform, it is possible to filter the data of any non-waveform or off-frequency noise 60. Specifically, the distinctive or "signature" waveform that one searches for in the response data corresponds to the specified perturbation that is applied through the controls for the variable input. If the measured response is dependent on the controlled input variable, the corresponding waveform can be identified above the noise using Fourier or other forms of data analysis.

Although the required data can now be acquired, the magnitude of the perturbations for the coal flows need to be corrected for phase differences introduced by the control system that is independently adjusting the coal mills that do not have the applied perturbation. In order to extract the individual mill contributions to the $NO_x$ response, the maximum $NO_x$ emission is synchronized with the maximum total coal flow, and the individual coal flows at that point are determined. The difficulty with this method is that the phase difference between the setpoint driven mill and controller following mills drifts slightly when analyzing a small number of data cycles in response to the selection of PID controller parameters. Fortunately, a more stringent condition is provided by the unperturbed response equations and the phase difference is computed by means of this mass conservation equation.

EXAMPLE FROM CASE STUDY 1

Matrix Calculation for $NO_x$ Emission Levels

The example matrix calculation given here is from the Case Study 1 Example below. Specifically, it is extracted from the 2004 tests conducted for the 430 MW tangentially-fired boiler.

Figure 2:
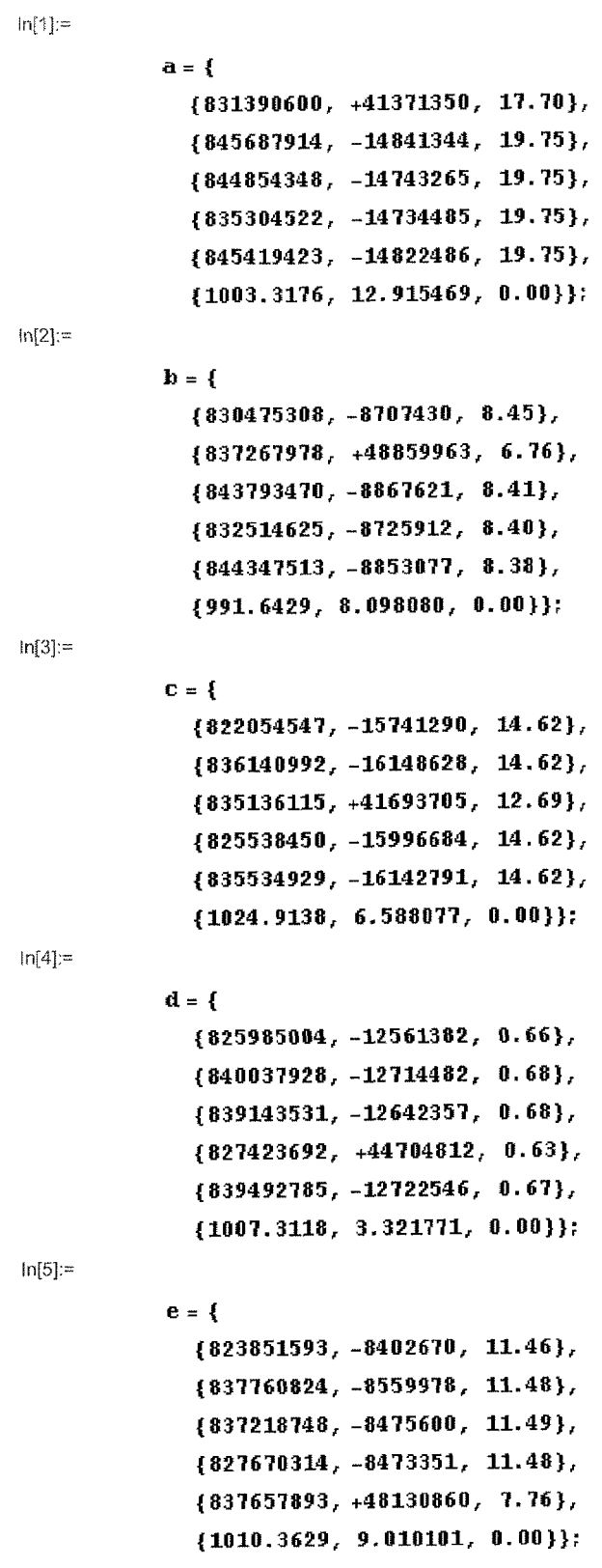

The matrices of FIG. 2 contain the reduced data from each test condition with mill feed rates in Btu/hr and phase differences referenced with respect to the $NO_x$ measurement in minutes. The matrix designation a, b, c, d, e, n, s1, s2, s3, represents the data from test cases where mill A, B, C, D, and E, respectively, had an applied waveform or oscillation, a case with no mill oscillation, and three cases in which the mill E had an applied oscillation and fuel from stockpile 1, 2, and 3, were respectively fed through mill E. Matrix rows correspond to mill A, mill B, mill C, mill D, mill E, and the $NO_x$ response. Matrix columns correspond to average mill flow rate in Btu/hr or $NO_x$ emission rate in lb/hr, the amplitudes of oscillating components occurring at a frequency of 48/day, and a phase value in minutes.

The functions shown in FIG. 3 define the triangular waveform of the driving function. Definitions for the individual wave functions for a given test case and a given mill follow it. For example, wfaA describes the waveform for mill "A" in the test case in which mill "a" is the driven mill. All the waveforms are referenced to a common phase difference, del, relative to the setpoint driven mill.

With reference to FIG. 4, "ta" through "t3" are the times corresponding to the maximum total coal flow, which is synchronized to the maximum $NO_x$ value.

With reference to FIG. 5, "avgMatrix" contains the average coal flow data from matrices "a", "b", "c", "d", and "e", which is transposed into "avgA" for solution of the simultaneous equation A·X=B. "avgB" contains the associated $NO_x$ response vector. A similar placeholder set of equations for the modulated signal are generated with the designation "ampA" and "ampB".

The equations of FIG. 6 substitute the phase corrected values into "ampA". Also, the phase corrected mill flows for the stockpile 1, stockpile 2 and stockpile 3 cases are generated and stored in vectors ampS1, ampS2, and ampS3, respectively.

Solution of the equation set ampA·ampX=ampB provides the level of $NO_x$ generation by mill in lb/Btu (displayed in FIG. 7). The value of del is adjusted to satisfy the total $NO_x$ mass balance.

Employing the $NO_x$ generation rates for mills A, B, C, and D, and the phase corrected mill flows for stockpiles 1, 2, and 3, the rate of $NO_x$ generation for these fuels is calculated from the modulated data mass balance.

Thus, the three values shown in FIG. 8 are the individual $NO_x$ generation rates in lb/Btu for the three test fuels (stockpile 1, stockpile 2 and stockpile 3) fired through Mill E. The total unit $NO_x$ emissions also includes the contribution from Mills A, B, C and D. As below, these numerical results are used to transform plant equipment and processes to a different, more efficient state, for example by allowing the recommendation of fuel type changes without having to have actually made the changes to determine whether the changes are necessary or desired in the first place.

EXAMPLE

Case Studies

The present invention is a method for determining the optimum operating practice for an industrial process. A perturbation test study may be conducted in a coal-fired furnace with the objective of quantifying the $NO_x$ response to existing plant control variables. The results are immediately applicable to optimize $NO_x$ in the furnace configuration over the normal operating range. The results are further usable as inputs to a computational model analysis to determine the optimum equipment modification and operating strategy for meeting a specified $NO_x$ target while simultaneously controlling LOI, slag, and corrosion. In other words, the calculated results and/or data can be applied in a practical manner to produce a useful result, e.g. the variables are optimized and resulting inputs are calculated to determine the optimum equipment configuration and operating protocol to, for instance, minimize $NO_x$ emissions during coal-fired burner processes.

These variables and parameters may be investigated to determine plant-specific quantification of the effect each has on $NO_x$ emissions. Perturbation testing is used in this regard. As a result, the applied perturbation data performs a function which is adapted to transform plant equipment and process to a different, more efficient state.

Two case studies of the application of perturbation testing for two different flow cases are given in the following material: 1. 430 MW tangentially-fired (t-fired) boiler equipped with ALSTOM CE LNCFS-3, and 2. 365 MW wall-fired boiler equipped with Riley Power Inc. CCV® burners, subsequently modified with a pulverized coal and primary air flow spreader and a flame stabilizer ring applied to the secondary air register.

Case Study 1. 430 MW Tangentially-Fired Boiler:

Two independent studies were completed in this boiler in successive years. The objective of the first series of tests conducted in 2004 is to determine the relative $NO_x$ generation rate for various new fuel types fired in the top firing level. The objective of the second test conducted one year later in 2005 is to fully characterize the effectiveness of the most promising new fuel type for reducing $NO_x$ generation in all five firing levels based on the determination of the previous $NO_x$ generation rate.

1.1 2004 Test Series

The main objective is to determine the relative $NO_x$ generation rate for various new fuel types fired in the top firing level. Prior to completing these fuel evaluation tests, the $NO_x$ generation rate is determined for each of the five firing levels in the 430 MW t-fired boiler.

The individual new fuel types are fired through the top burner elevation (Mill E). A ±5% oscillation with a 30-minute period (triangular waveform created by linear ramp up and down) is applied to the Mill E gravimetric feeder. The usual fuel type is fired through the other mills. In the furnace characterization test, the same oscillation is individually applied to each of the mill feeders (A, B, C, D, and E) when firing the usual fuel type through all mills. The $NO_x$ signal is continuously monitored and recorded during both tests for analysis using the matrix calculation methods in the subject invention.

The three fuels tested give lower $NO_x$ generation rates (lb/MMBtu) relative to firing the usual fuel type through Mill E, although the 2.62% reduction for Stockpile 2 is comparable to the experimental error of the test measurement. The results are listed in table 1 below.

TABLE 1

$NO_x$ Generation by Fuel Type Fired Through Mill E at 430 MW Load

| Fuel | $NO_x$ Generation Rate (lb/MMBtu) | Difference Relative to Usual Fuel Type (%) |
|---|---|---|
| Usual Fuel | 0.3130 | 0.00 |
| Stockpile 1 | 0.2345 | −25.08 |
| Stockpile 2 | 0.3048 | −2.62 |
| Stockpile 3 | 0.2476 | −20.89 |

Stockpile 1 gives the lowest $NO_x$ generation, 25.08% lower than the usual fuel type.

Stockpile 2 gives a $NO_x$ generation rate 2.62% lower than the usual fuel type, and 29.98% greater than Stockpile 1.

Stockpile 3 gives a $NO_x$ generation rate 20.89% lower than the usual fuel type, 18.77% lower than Stockpile 2, and 5.59% higher than Stockpile 1.

The $NO_x$ generation rate is substantially different for each mill (corresponding to burner elevation) while firing the usual fuel type at 430 MW load in this t-fired unit. These results are displayed in table 2 below.

TABLE 2

$NO_x$ Generation by Mill while Firing Usual Fuel at 430 MW Load

| Mill | $NO_x$ Generation Rate (lb/MMBtu) | Proportion of $NO_x$ Generation (%)* |
|---|---|---|
| A | 0.1182 | 9.82 |
| B | 0.2994 | 24.88 |
| C | 0.2456 | 20.41 |
| D | 0.2273 | 18.89 |
| E | 0.3130 | 26.01 |

*based on uniform fuel distribution to mills

The highest $NO_x$ generation rate is observed for Mill E, 0.313 lb/MMBtu, which amounts to 26.01% of the total unit $NO_x$ output. The $NO_x$ generation rate for the new fuel types will be different if they are introduced through Mills A, B, C or D.

The perturbation test results show that five distinct combustion environs are created by the low-$NO_x$ tangential firing system in the 430 MW unit, which give five different $NO_x$ generation environments that are characterized as follows:

Burner level A is deeply-staged and $NO_x$ generation is very low due to three factors:
  dead ended below by the ash hopper (no added oxygen source below)
  standard operating practices are −15° tilt for the main burner zone
  only adjacent firing elevation is above
These factors offset higher primary air levels in Mill A.
Burner level B is more oxidizing and $NO_x$ generation is higher owing to two factors:
  higher primary air flows
  adjacent firing elevations both above and below
Burner level C gives average $NO_x$ generation within the experimental error. It is characterized by:
  usual primary air flows
  adjacent firing elevations both above and below
Burner level D gives $NO_x$ generation slightly below average. Like Level C, it is characterized by:
  usual primary air flows
  adjacent firing elevations both above and below
The difference is that the oxygen concentration in the gases below is less than those below burner level C due to more complete consumption by the fuel.
Burner level E is most oxidizing and $NO_x$ generation is highest because of the close proximity of over fire air above.

To fully characterize the effectiveness of the new fuel types for reducing $NO_x$ emission levels for the 430 MW unit, it is necessary to conduct a comprehensive study that includes testing in each of the five levels.

1.2 2005 Test

The objective is to fully characterize the effectiveness of the most promising new fuel type for reducing $NO_x$ generation in all five firing levels. Comparative $NO_x$ generation results or the new fuel type relative to the baseline fuel for all firing levels are given in table 3 below.

TABLE 3

Comparative $NO_x$ Generation Rates for the Baseline Coal and New Fuel Type Tests

| | Baseline Fuel | | New Fuel Type | | Percentage |
|---|---|---|---|---|---|
| Mill | $NO_x$ Generation Rate (lb/MMBtu) | Proportion of $NO_x$ Generation* | $NO_x$ Generation Rate (lb/MMBtu) | Proportion of $NO_x$ Generation* | Change in $NO_x$ Generation Rate |
| A | 0.1234 | 8.71% | 0.1637 | 12.47% | 32.73% |
| B | 0.0687 | 4.85% | 0.0752 | 5.73% | 9.42% |
| C | 0.5947 | 41.99% | 0.6166 | 46.96% | 3.68% |
| D | 0.3058 | 21.59% | 0.3061 | 23.31% | 0.09% |
| E | 0.3238 | 22.86% | 0.1514 | 11.53% | −53.23% |

*based on uniform fuel distribution to mills

The new fuel type exhibits significant benefit in the top firing level, consistent with the 2004 test results. The change in $NO_x$ is −53.23% for firing level E.

The overall $NO_x$ reduction for the application of the new fuel type in all firing levels is 10.5%. This overall reduction is not evident by comparing the $NO_x$ CEM response curves for the baseline fuel test and new fuel type test because of operating differences (some control-induced) between the two tests that impact furnace configuration and mixing of solid fuel and air. Perturbation testing permits determination of this reduction by giving a consistent basis for analysis and comparison between tests.

Differences are observed in furnace configuration for all tests. Between the 2004 and 2005 tests, the plant completed a control system upgrade, increased average load by 10 MW from 430 MW to 440 MW, and changed primary air distribution. In the 2005 tests, operating fluctuations in burner and over fire air tilt, secondary air flow rates and overall coal flow rates are noted between the baseline fuel test and new fuel type test that result in variation in the measured $NO_x$ levels that are of the same order of magnitude as the overall furnace reduction that can be attributed to the fuel type.

Case Study 2. Wall-Fired Boiler:

The perturbation test program sequence used in this program is summarized in Table 4.

TABLE 4

Summary Test Parameters and NO$_x$ Response Data

| Date | Perturbation Parameter | Period (min) | Peak to Peak Impulse | Average NOx (#/MMBtu) | NOx Perturbation (#/MMBtu) | Fractional NOx per Unit Impulse |
|---|---|---|---|---|---|---|
| May 17, 2004 | Coal Mill A | 10 | 10% | 0.4235 | 0.001210 | 0.0286 |
| May 18, 2004 | Coal Mill B | 10 | 10% | 0.4228 | 0.000338 | 0.0080 |
| May 5, 2004 | Coal Mill C | 10 | 10% | 0.4123 | 0.001100 | 0.0267 |
| May 6, 2004 | Coal Mill D | 10 | 10% | 0.3927 | 0.000387 | 0.0099 |
| May 20, 2004 | Coal Mill E | 10 | 10% | 0.4451 | 0.000285 | 0.0064 |
| Jun. 8, 2004 | Coal Mill F | 10 | 10% | 0.4233 | 0.001184 | 0.0280 |
| Aug. 16, 2004 | Primary Air Row A | 20 | 6% | 0.4520 | 0.002164 | 0.0798 |
| Aug. 24, 2004 | Primary Air Row B | 20 | 6% | 0.4307 | 0.001080 | 0.0418 |
| Aug. 25, 2004 | Primary Air Row C | 20 | 6% | 0.4189 | 0.000974 | 0.0388 |
| Aug. 26, 2004 | Primary Air Row D | 20 | 6% | 0.4138 | 0.001316 | 0.0530 |
| Aug. 31, 2004 | Primary Air Row E | 20 | 6% | 0.4132 | 0.002787 | 0.1124 |
| Sep. 1, 2004 | Primary Air Row F | 20 | 6% | 0.4138 | 0.002228 | 0.0897 |
| Sep. 22, 2004 | Secondary Air Row A | 20 | 6% | 0.4284 | 0.003199 | 0.1245 |
| Sep. 21, 2004 | Secondary Air Row B | 20 | 6% | 0.3830 | 0.001280 | 0.0557 |
| Sep. 27, 2004 | Secondary Air Row C | 20 | 6% | 0.4232 | 0.001524 | 0.0600 |
| Oct. 12, 2004 | Secondary Air Row D | 20 | 6% | 0.4464 | 0.000627 | 0.0234 |
| Oct. 11, 2004 | Secondary Air Row E | 20 | 6% | 0.4250 | 0.000891 | 0.0349 |
| Sep. 30, 2004 | Secondary Air Row F | 20 | 6% | 0.4500 | 0.001580 | 0.0585 |
| Oct. 5, 2004 | Secondary Air Column 1 | 20 | 6% | 0.4549 | 0.001955 | 0.0716 |
| Oct. 6, 2004 | Secondary Air Column 2 | 20 | 6% | 0.4787 | 0.000485 | 0.0169 |
| Oct. 7, 2004 | Secondary Air Column 3 | 20 | 6% | 0.4661 | 0.000404 | 0.0144 |
| Oct. 8, 2004 | Secondary Air Column 4 | 20 | 6% | 0.4148 | 0.002501 | 0.1005 |

The date, perturbation parameter, and the induced perturbation cycle period and peak-to-peak impulse are listed for each test. The waveform employed in these tests is a square wave generated by step changes up and down. The perturbation test program shown spanned over a period of five months between May and October 2004. The average NO$_x$ response, NO$_x$ perturbation and fractional NO$_x$ per unit impulse also are shown for each test. The individual average NO$_x$ values for each test range from 0.38 to 0.48 lbs/MM Btu for the test period. The average value for all tests is 0.428 lbs/MM Btu. The observed NO$_x$ perturbation values range from 0.0004 to 0.003 lbs/MM Btu, and the fractional NO$_x$ per unit impulse values range from 0.001 to 0.125.

As shown above, and for purposes of the subject invention, is therefore known that the balance of coal flow to the burners in a coal-fired power plant can have significant impacts on combustion efficiency, residual carbon in fly ash, and NO$_x$ emissions. Even a small burner-to-burner imbalance can significantly impact boiler performance.

The principal conclusions of such a perturbation test study are:

Primary air exhibits the strongest NO$_x$ response.

The secondary air effect on NO$_x$ is 80% that of the primary air.

The secondary air for outside burner columns (next to side walls) exhibits five times the impact of interior burner column secondary air.

The best promise for NO$_x$ reduction can be realized through secondary air redistribution.

To optimize NO$_x$ emission levels for this furnace, it was thereafter recommended that the owner:

Carry out burner design study and modification to control coal/primary air.

Conduct secondary air windbox design optimization study.

Work with system asymmetry (side-to-side and front-to-rear) to tune the furnace, not back-end profiles.

Reduce swirl on higher elevation burners with increasing load to reduce NO$_x$; use normal swirl settings for flame stabilization on burners during start-up or low-load operations.

Optimally tune secondary air controllers using higher order methods; operators cannot provide the control levels required to truly optimize NO$_x$ emission levels.

We claim:

1. A method for determining a best operating practice for minimizing emissions of NO$_x$ at a fossil fuel-fired plant, comprising the steps of:

reviewing normal operation data for a normal configuration of equipment at said plant;

specifying a time-dependent perturbation based on the review of said normal operation data;

applying said perturbation to one or more fuel inputs to give a signature in said normal operation data;

acquiring measured response data from said fuel inputs with said signature to form a perturbation test data set;

analyzing said perturbation test data set, further comprising the steps of:

filtering said perturbation test data set, wherein said perturbation test data set is filtered by applying a signature perturbation waveform formed by said signature in said normal operation data; and, carrying out matrix calculations for said perturbation test data set, wherein a mass per unit energy value is quantified to allow said normal configuration of said equipment to be optimized to reduce said NO$_x$ without changing said normal configuration to determine said best operating practice.

2. The method of claim 1, wherein said perturbation specified does not correspond with any identifiable inherent operating frequencies used by plant operators.

3. The method of claim 1, wherein said perturbation is a periodic function.

4. The method of claim 1, wherein said fuel inputs include gaseous, solid, or liquid feeds.

5. The method of claim 1, wherein for the step of acquiring said measured response data, said measured response data is collected and stored using a plant data acquisition system.

6. A method for determining the best operating practice for minimizing emissions of $NO_x$ at a fossil fuel-fired plant, comprising the steps of:

reviewing normal operation data for a normal configuration of equipment at said plant;

specifying a time-dependent perturbation based on the review of said normal operation data;

applying said perturbation to one or more fuel inputs to give a signature in said normal operation data;

acquiring measured response data from said fuel inputs with said signature to form a perturbation test data set;

analyzing said perturbation test data set, further comprising the steps of:

filtering said perturbation test data set; and, carrying out matrix calculations for said perturbation test data set by solving for a value $\phi_i$ within a set of simultaneous equations of the form:

$$\Delta y = \sum_{all\, i} \phi_i \Delta x_i$$

wherein y is a mass rate of emission of said $NO_x$, $x_i$ are energy rates of fuel feed, and i is a number of said fuel inputs; and, wherein said values $\phi_i$ correlate to quantified mass per unit energy values of said $NO_x$ to allow said normal configuration of said equipment to be optimized to reduce said $NO_x$ without changing said normal configuration to determine said best operating practice.

7. The method of claim 6, wherein said perturbation specified does not correspond with any identifiable inherent operating frequencies used by plant operators.

8. The method of claim 6, wherein said perturbation is a periodic function.

9. The method of claim 6, wherein said perturbation test data set is filtered by applying a signature perturbation waveform formed by said signature in said normal operation data.

10. The method of claim 6 wherein said fuel inputs include gaseous, solid, or liquid feeds.

11. The method of claim 6, wherein for the step of acquiring said measured response data, said measured response data is collected and stored using a plant data acquisition system.

* * * * *